United States Patent [19]

Iwamura

[11] Patent Number: 5,255,124
[45] Date of Patent: Oct. 19, 1993

[54] CAM RING OF LENS BARREL AND METHOD FOR MANUFACTURING SAME

[75] Inventor: Makota Iwamura, Tokyo, Japan

[73] Assignee: Asahi Kogaku Kogyo Kabushiki Kaisha, Tokyo, Japan

[21] Appl. No.: 865,764

[22] Filed: Apr. 10, 1992

Related U.S. Application Data

[63] Continuation of Ser. No. 377,554, Jul. 10, 1989, abandoned.

[30] Foreign Application Priority Data

Mar. 9, 1989 [JP] Japan ............................... 1-26803[U]
Apr. 26, 1989 [JP] Japan ............................... 1-106985

[51] Int. Cl.$^5$ ............................................. G02B 15/14
[52] U.S. Cl. ................................... 359/694; 359/699; 359/704
[58] Field of Search ............... 350/252, 255, 257, 429, 350/422; 354/402, 195.1–195.13, 286, 400, 286, 410; 359/694–706, 819–822, 823, 825, 824, 827, 813

[56] References Cited

U.S. PATENT DOCUMENTS

| | | | |
|---|---|---|---|
| 1,950,166 | 3/1934 | Durholz | 354/195.11 |
| 3,931,629 | 1/1976 | Himmelsbach | 354/195.1 |
| 3,980,398 | 9/1976 | Von Belvard | 359/705 |
| 4,154,510 | 5/1979 | Katagiri | 359/826 |
| 4,465,344 | 8/1984 | Sumi | 359/823 |
| 4,506,959 | 3/1985 | Hama | 350/255 |
| 4,560,237 | 12/1985 | Ohkura et al. | 350/255 |
| 4,585,313 | 4/1986 | Iwata et al. | 359/823 |
| 4,627,691 | 12/1986 | Tomori | 350/429 |
| 4,731,629 | 3/1988 | Aoshima et al. | 354/410 |
| 4,759,618 | 7/1988 | Kamata | 359/703 |
| 4,805,991 | 2/1989 | Arai et al. | 359/824 |
| 4,822,153 | 4/1989 | Tomori et al. | 350/255 |
| 4,834,514 | 5/1989 | Atsuta et al. | 350/255 |
| 4,910,544 | 3/1990 | Nomura | 350/255 |
| 4,925,282 | 5/1990 | Kanno et al. | 350/429 |
| 4,941,542 | 3/1990 | Nishio et al. | 350/255 |
| 4,950,060 | 8/1990 | Nagasaka | 359/823 |

FOREIGN PATENT DOCUMENTS

| | | |
|---|---|---|
| 0273382 | 7/1988 | European Pat. Off. |
| 4374375 | 8/1968 | Fed. Rep. of Germany |
| 2319403 | 11/1974 | Fed. Rep. of Germany |
| 2712051 | 9/1977 | Fed. Rep. of Germany |
| 3276562 | 4/1984 | Fed. Rep. of Germany |
| 162034 | 7/1986 | Japan ............ 354/286 |
| 63-137019 | 6/1988 | Japan |
| 1431463 | 4/1976 | United Kingdom |

OTHER PUBLICATIONS

European Search Report (for E.P.O. Application No. 0 273 382.), Sep. 4, 1988.

*Primary Examiner*—Bruce Y. Arnold
*Assistant Examiner*—Thong Nguyen
*Attorney, Agent, or Firm*—Sandler, Greenblum & Bernstein

[57] ABSTRACT

A cam ring of a substantially annular shape for a lens barrel including at least one cam groove in which a guide pin provided on a lens group which is movable in an optical axis direction is placed and a gear which is provided on an outer periphery of the cam ring to rotate the cam ring, wherein at least a part of the cam groove is in the form of an inner cam groove with a closed bottom located on the outer surface thereof. The gear is integrally formed on the outer surface of the cam ring. The invention is also directed to a method for manufacturing such a cam ring.

26 Claims, 5 Drawing Sheets

CAM RING OF LENS BARREL AND METHOD FOR MANUFACTURING SAME

This application is a continuation of application Ser. No. 07/377,554, filed Jul. 10, 1989, now abandoned.

BACKGROUND OF THE INVENTION

1. Field of the Invention

The present invention relates to a cam ring used in a lens barrel and a method for manufacturing the same.

2. Description of Related Art

A lens barrel having a cam ring is commonly used in a zoom lens. The cam ring has for example, two cam grooves in which guide pins for a front and rear group of movable lenses are fitted, so that when the cam ring rotates, the movable lens groups are moved in accordance with profiles of the cam grooves to vary the focal length.

In the lens barrel as mentioned above, in the case where the cam ring is driven to rotate by an electrical drive mechanism, it is necessary to provide a gear on the outer periphery of the cam ring. To this end, a separate gear ring is secured to the outer periphery of the cam ring in a conventional lens barrel. The cam grooves are usually in the form of through openings on which the gear ring is usually superimposed. It is therefore next to impossible to form the cam ring integral with the gear ring.

The assignee of the present application has proposed a zoom lens barrel in which a cam ring is supported so as to move along an optical axis direction in accordance with the rotation thereof to decrease the length necessary for accommodating the zoom lens barrel in a camera body (Japanese Patent application No. 63-137019). In this zoom lens barrel, the cam ring is provided, on its outer periphery, with a male helicoid (thread) which serves as a rotational guide means and which is engaged by a stationary female helicoid. Also, in this zoom lens barrel, the male helicoid is provided on a helicoid ring which is made of a piece that is separate from the cam ring for the same reason as that mentioned above. The helicoid ring must be secured to the cam ring at a later time. It is also necessary to provide a gear for rotating the cam ring on the helicoid ring.

SUMMARY OF THE INVENTION

The primary object of the present invention therefore is to eliminate the above-mentioned drawbacks of the prior art in which the gear ring or the helicoid ring; which is made of a separate piece from the cam ring, must be secured at a later time to the cam ring, by providing a cam ring which has a gear or helicoid that is integrally formed therewith.

Another object of the present invention is to provide a method for effectively and precisely manufacturing such a cam ring having a gear and/or a helicoid integral therewith.

The inventor of the present invention has found that the rotational guide means (cam or helicoid) can be integrally formed on the outer periphery of the cam ring by providing inner cam grooves having closed outer surfaces (bottoms) on the cam ring, in place of the conventional cam grooves which are in the form of through openings.

To achieve the object mentioned above, according to the present invention there is provided a lens barrel having a rotatable cam ring which has at least one cam groove, at least a part of which is in the form of an inner cam groove having a closed bottom located on the inner surface of the cam groove, said cam ring being provided on its outer periphery with a gear and/or a rotational guide means that is integrally formed therewith.

The highly developed modern metal machining processes make it possible to mold or form the inner cam groove and the gear and/or the rotational guide means integral with the cam ring. If the cam ring is made of a synthetic resin material, such an integral molding can be more easily performed. It is noted that the rotational guide means can be a cam as well as the above-mentioned helicoid.

The cam groove can be either linear or non-linear. The present invention can be advantageously applied particularly to a non-linear cam groove.

A method for manufacturing a cam ring according to the present invention is characterized in that the cam ring and the gear (and/or the rotational guide means) which are both made of synthetic resin are integrally molded at one time, and then, the cam groove is formed by a cutting operation.

In theory, the gear and/or the rotational guide means can be formed by a cutting operation after the cam ring is made. However, it has been found that the gear and/or the rotational guide means can be precisely formed at the same time as the formation of the cam ring.

Similarly, in theory, it is possible to form the cam grooves simultaneously with the formation of the cam ring by using split type molding dies. However, it should be taken into account that the cam groove which determines a track of the movement of the lens group is usually non-linear, and accordingly, must be more accurate than a linear groove. Furthermore, particularly in the case where such a non-linear cam groove is formed using split type molding dies, the cam groove usually bridges the molding dies. It is, however, very difficult to make a smooth connection of the bridged portion.

In other words, the present invention satisfies both the requirements for a reduced manufacturing cost and high precision. The former requirement can be achieved by a technical idea that the gear (and/or the rotational guide means) are formed by molding to reduce the manufacturing cost, since those portions do not need a high precision. On the other hand, the latter requirement can be achieved by forming the cam grooves, which need higher precision, by the cutting operation after the cam ring is molded.

Alternatively, it is also possible to form the cam groove in two steps, in which the first formation is effected by molding and the second formation (finishing machining) is effected by cutting. It is noted that in the present application, the term "cutting" of the cam groove also includes such a finishing machining.

BRIEF DESCRIPTION OF THE DRAWINGS

The invention will be described below in detail, with reference to the accompanying drawings, in which.

DESCRIPTION OF PREFERRED EMBODIMENTS

Figure 1:
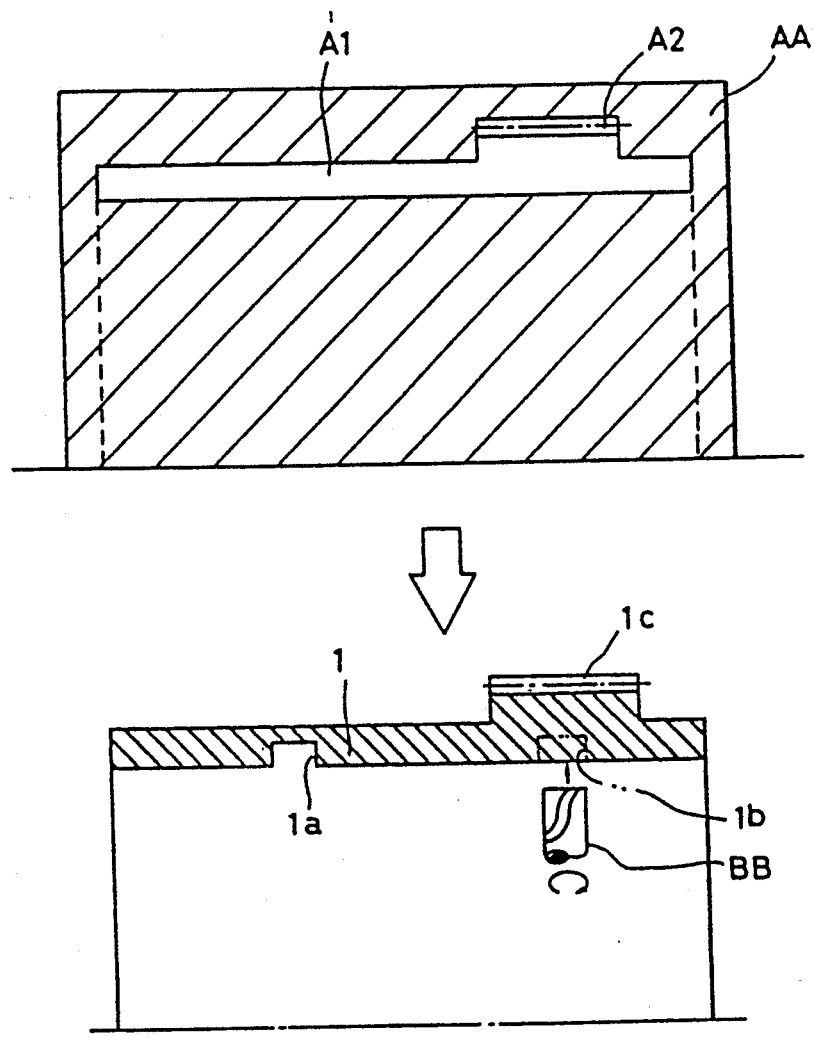
FIG. 1 is a sectional view showing successive steps for manufacturing a cam ring according to the present invention.

FIG. 1 is a sectional view showing how to manufacture a cam ring according to an aspect of the present invention.

An injection molding die AA for resin material has an annular space A1 corresponding to a cam ring, and a gear forming space A2 which is located on a part of the outer periphery of the cam ring forming annular space A1 to be connected thereto. Although the molding die AA is illustrated as a single piece, it is actually of a split type. The injection molding die AA is provided with an injection port (not shown), through which a molten resin material is introduced into the cam ring forming annular space A1.

In the present invention, a molten resin material is injected in the cam ring forming annular space A1 and the gear forming space A2 of the injection molding die AA to mold a whole cam ring 1 and a gear 1c, which are provided on a part of the outer periphery of the cam ring 1. After that, the cam ring 1 is removed from the molding die AA and is cut by a cutting tool BB to form inner cam grooves 1a and 1b on the inner surface of the cam ring 1. The inner cam grooves 1a and 1b have closed bottoms and are open to the inner surface of the cam ring 1. The inner cam grooves 1a and 1b can be easily cut by a known cutting operation.

With the manufacturing process mentioned above, because the manufacturing cost can be reduced cam ring 1 and the gear 1c are integrally injection-molded at one time. It should be appreciated that the gear which is formed by the injection molding has a satisfactory precision. The inner cam grooves, which need higher precision than the gear, can be precisely formed by the cutting operation.

Figure 2:
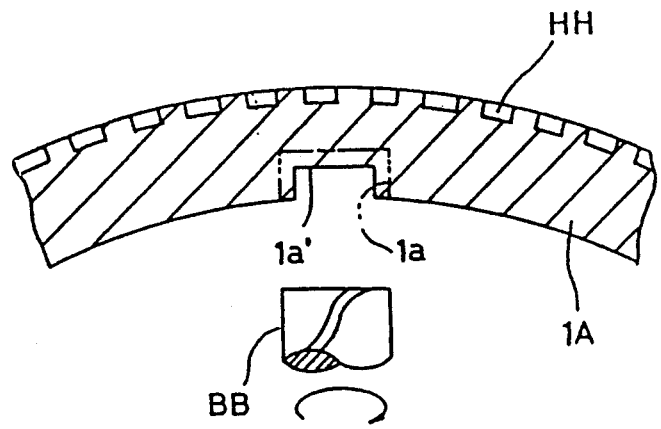
FIG. 2 is a sectional view showing another step in manufacturing a cam ring according to the present invention.

FIG. 2 shows another embodiment in which a helicoid HH is formed on the outer periphery of the cam ring 1A by injection molding. The cam ring 1A has the inner cam groove 1a on the inner surface thereof. The inner cam groove 1a can be formed by a cutting operation similar to that shown in FIG. 1. Alternatively, it is also possible to form the inner groove in two steps. That is a primary inner cam groove 1a' is first formed by injection molding and then a secondary (finished) inner cam groove 1a is formed by cutting. Such a multi-step formation of the inner cam groove contributes to a decreased consumption of resin material and to an increased service life of the cutting tool BB, due to a decreased amount of the cam ring that needs to be cut.

A synthetic resin material, from which the cam ring 1 is made, should have a good injection molding property and a high machinability (cutting property). Suitable materials include polycarbonate, polyphenylensulfide, or polyphenylenoxide.

It is preferable to add fluorine or carbon as a lubricant and glass fiber or carbon as a reinforcement to the synthetic resin material. The added carbon also contributes to a high precision of dimension and a high stability of dimension.

Figure 3:
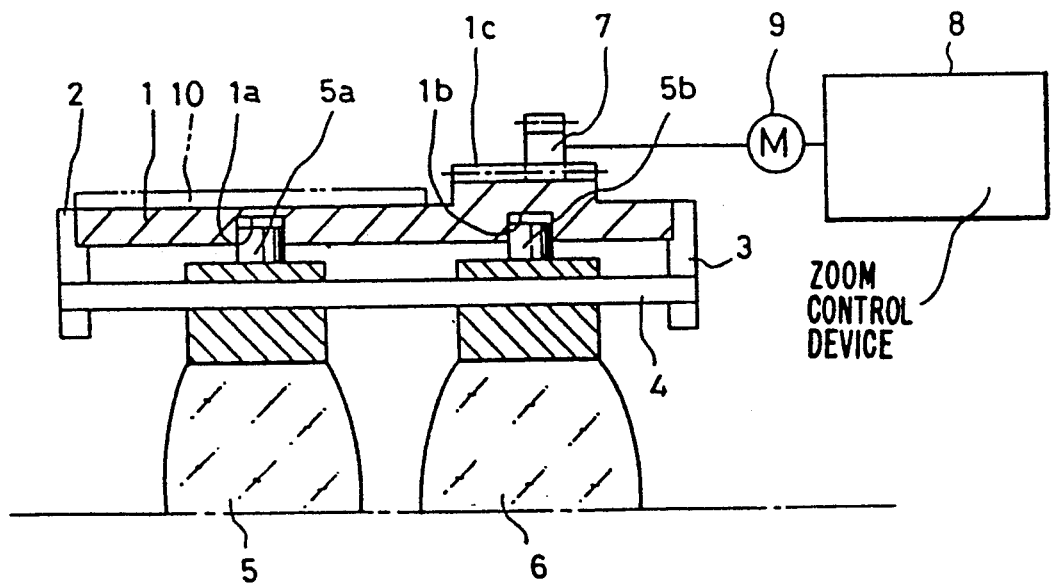
FIG. 3 is a sectional view of an upper half of a lens barrel in which the cam ring, shown in FIG. 1, is incorporated.

FIG. 3 shows a lens barrel in which the cam ring 1, shown in FIG. 1 is incorporated. The cam ring 1, is rotatably supported between a front securing plate 2 and a rear securing plate 3. The front and rear securing plates 2 and 3 are interconnected by a guide rod 4 which extends in parallel with an optical axis of the lens. A front group of lenses (frame) 5 and a rear group of lenses (frame) 6 are movably supported on the guide rod 4.

Guide pins 5a and 5b of the front lens group 5 and the rear lens group 6 are fitted, in the inner cam grooves 1a and 1b of the cam ring 1, respectively. The gear 1c is engaged by a pinion 7, which is rotated by a motor 9, which is in turn driven through a zoom control circuit 8, so that when the motor 9 is driven to rotate, the cam ring 1 is rotated to move the front lens group 5 and the rear lens group 6 along the optical axis direction in accordance with the cam profiles of the inner cam grooves 1a and 1b in order to effect zooming.

According to the present invention, as mentioned above, the cam grooves, which are to be formed on the cam ring 1, are in the form of inner cam grooves with closed bottoms and the gear 1c is integrally formed on the outer periphery of the cam ring, resulting in the use of fewer components for the lens barrel and fewer assembling steps.

In FIG. 3, cam projection 10 functions as a rotational guide means provided on the outer pheriphery of the cam ring 1, as drawn by an imaginary line. The cam projection 10 engages with a stationary recess (not shown) so that the cam ring 1 moves in the optical axis direction while rotating.

Figure 4:
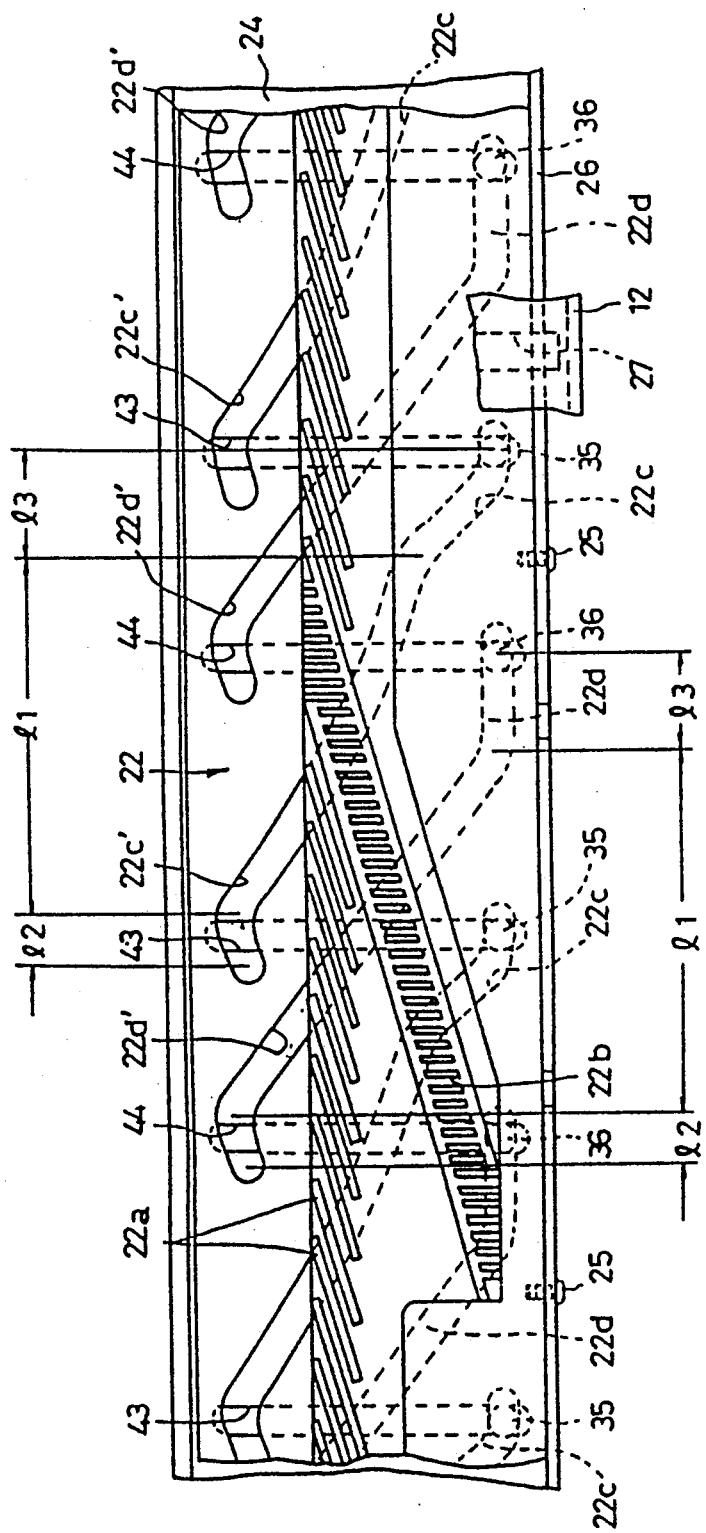
FIG. 4 is a development view of a cam ring according to another aspect of the present invention; and, FIGS. 5 through 7 are sectional views of an upper half of a lens barrel in which the cam ring shown in FIG. 4 is incorporated, shown in an accomodated position, a wide extremity position and a tele-extremity position, respectively.

A cam ring 22, which is shown in FIG. 4 by way of an example, is provided on its outer surface with a gear 22a and a helicoid 22b and on its inner surface with cam grooves which are partly in the form of inner cam grooves 22c and 22d with closed bottoms and partly in the form of through openings 22c' and 22d'. The inner cam grooves 22c and 22d, which have closed outer surface portions (bottoms), correspond to the gear 22a and the helicoid 22b and the through opening 22c' and 22d' correspond to the remaining portion of the cam ring that has neither the gear nor the helicoid, so that each of the cam grooves has a non-linear profile.

The cam ring 22 is essentially formed by the same processes as mentioned above with reference to FIG. 1 or 2.

Figure 5:
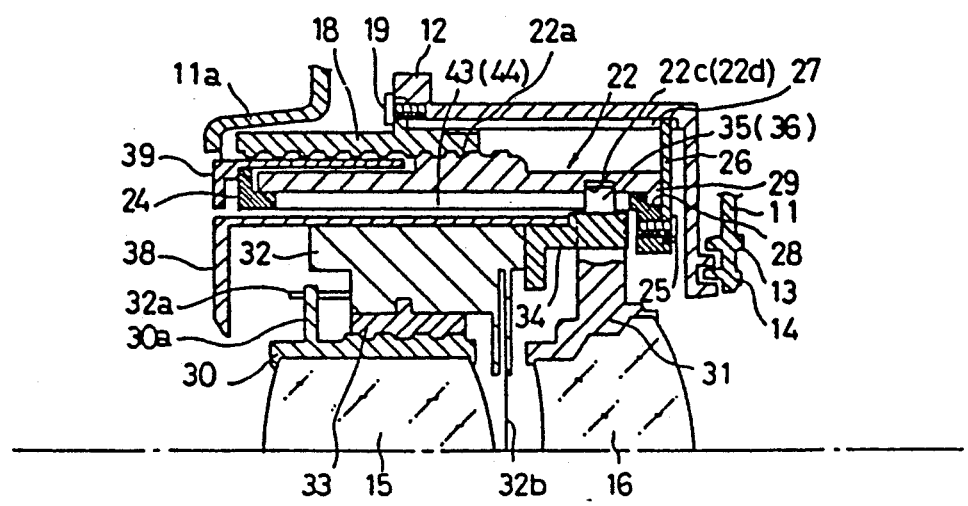
Figure 6:
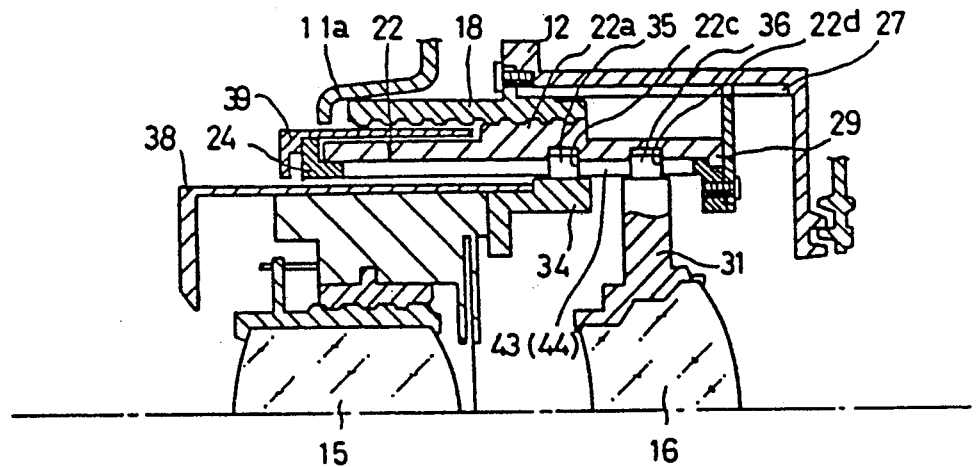
Figure 7:
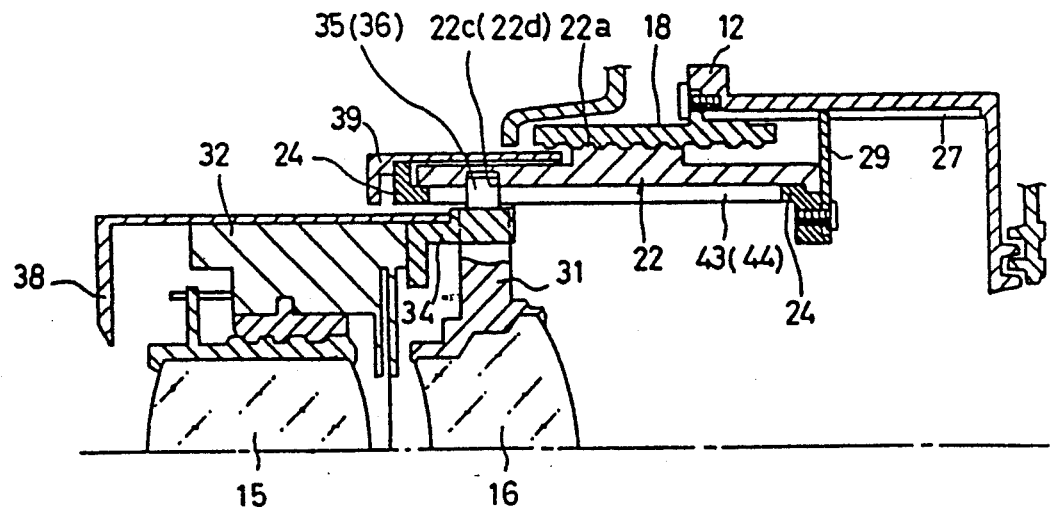

FIGS. 5 through 7 show a zoom lens barrel in which the cam ring 22, shown in FIG. 4; is incorporated.

The basic construction of the zoom lens barrel shown in FIGS. 5-7 is similar to that of the lens barrel as disclosed in the above-mentioned Japanese Patent Application No. 63-137019 proposed by the assignee of the present application except for the cam ring 22, with which the gear 22a and the helicoid 22b are integrally formed. The construction and the operation of the lens barrel are as follows.

The camera body 11 of a lens shutter type camera has a stationary barrel 12 secured thereto. The camera body has an outer rail 13 and an inner rail 14, both serving as a film guide.

An outer helicoid (which has helicoid teeth on its inner periphery) 18 is secured to the stationary barrel 12 through a machine screw 19. The cam ring 22, shown in FIG. 4, is located in the outer helicoid 18. The cam ring 22 has an inner peripheral helicoid 22b (which has helicoid teeth on its outer periphery) which is engaged by the outer helicoid 18, and a gear 22a which is inclined at an inclination angle similar to that of the helicoid teeth of the inner helicoid 22b. The gear 22a is in mesh with a pinion 7, as shown in FIG. 3, so that the forward and reverse rotations of the pinion 7 cause a forward and reverse rotations of the cam ring 22. Consequently, the cam ring 22 moves along the optical axis direction, in accordance with the lead of the helicoid 22b when the cam ring 22 rotates. The inclination of the gear 22a enables the axial movement of the cam ring 22.

A lens guide ring 24 is fitted in the cam ring which has a linear movement guide plate 26 secured to the rear end thereof by a set screw 25. The linear movement guide plate 26 is partially engaged, at its outer surface, in a, lens linear movement guide groove 27 formed on the inner face of the stationary barrel 12. An inner flange 29, which is formed at the rear end of the cam ring 22, is fitted in an annular groove 28 which is formed between the linear movement guide plate 26 and the rear end of the lens guide ring 24. Consequently, the rotational movement of the lens guide ring 24 is restricted by the lens linear movement guide groove 27, but the lens guide ring 24 can move with the cam ring 22 along the optical axis direction. The cam ring 22 is rotatable relative to the lens guide ring 24.

The front and rear lens groups 15 and 16 are secured to a front lens group frame 30 and a rear lens group frame 31, respectively. The front lens group frame 30 is engaged by a helicoid ring 33 which is secured to a shutter block 32. The shutter block 32 is secured to a front lens group moving frame 34 which is provided on its outer periphery with a plurality of guide pins 35. The rear lens group frame 31 is also provided on its outer periphery with a plurality of guide pins 36. Although the guide pins 35 and 36 are illustrated to be overlapped in FIGS. 5 and 7 for convenience sake, they are actually located in different phases.

The shutter block 32 rotates a drive pin 32a by an angle corresponding to an object distance to be photographed detected by an object distance measuring device to rotate the front lens group frame 30 connected to the drive pin 32a in the same directions in order to move the front lens group frame 30 along the optical axis direction in accordance with the helicoid to thereby effect an adjustment of focus. The shutter block 32 also actuates shutter blades 32b in accordance with a brightness signal of the object to be photographed.

A cylindrical lens cover 38, is integral with the front lens group moving frame 34 and a decorative ring 39 which protrudes from a body shell 11a of the camera to cover the outer peripheries of the lens guide ring 24 and the cam ring 22, respectively.

The guide pins 35 and 36 are inserted in the through openings 22c′ and 22d′ which are formed at the portions in which neither the helicoid 22a nor the gear 22b are positioned, as mentioned above.

The lens guide ring 24 is provided with lens linear movement guide grooves 43 and 44 corresponding to the front lens group cam grooves 22c and the rear lens group cam grooves 22d. The guide pins 35 are inserted in both the lens linear movement guide grooves 43 and the front lens group cam grooves 22c. The guide pins 36 are inserted in both the lens linear movement guide grooves 44 and the rear lens group cam grooves 22d.

The profiles of the front lens group cam grooves 22c and the lens linear movement guide grooves 43 and the profiles of the rear lens group cam groove 22d and the lens guide grooves 44 are designed so that the movable lens groups 15 and 16 are moved along predetermined tracks along the optical axis direction by the axial movements of the cam ring 22 and the lens guide ring 24, which are caused by the rotation of the cam ring 22 and the relative rotation of the cam ring 22 and the lens guide ring 24. In the front lens group cam grooves 22c and the rear lens group cam grooves 22d shown in FIG. 4, sections $l_1$, $l_2$ and $l_3$ are a zooming section, a macro-transferring section connected to the tele-extremity of the zooming section $l_1$ and lens accommodation section connected to the wide-extremity of the zooming section $l_1$, respectively.

In the lens barrel as constructed above, when the cam ring 22 is rotated through the gear 22a in the forward and reverse directions, and the cam ring 22 moves along the optical axis direction in accordance with the lead of the helicoid 22b while rotating, since the outer helicoid 18, which is engaged by the helicoid 22b is immovable, so that the lens guide ring 24 also moves along the optical axis direction. As a result of the axial movement of the lens guide ring 24, the cam ring 22 rotates relative to the lens guide ring 24 in accordance with a relationship between the cam grooves 22c, 22d and the lens linear movement guide grooves 43, 44. The relative rotation of the cam ring 22 and the lens guide ring 24 causes the lens groups 15 and 16 to move along the optical axis direction. This makes it possible to move the lens groups 15 and 16 from the lens accommodation position shown in FIG. 5 to the tele-extremity position shown in FIG. 7. It should be appreciated that in the lens accommodation position, the cam ring 22 and the lens guide ring 24 do not protrude from the camera body, thus resulting in a decreased accommodation length.

In the modified embodiment as mentioned above, as in the embodiment shown in FIGS. 1–3, since at least a part of each of the cam grooves formed on the cam ring 22 is an inner cam groove with a closed bottom, and since the gear 22a and the helicoid 22b are integrally formed with the cam ring 22, the number of separate components and the assembly processes are reduced. In the illustrated embodiment, it is possible to integrally provide only the gear 22a or the helicoid 22b on the cam ring 22.

According to the present invention, since the cam ring and the gear and/or the helicoid are integrally molded of resin at one time, and since the inner cam grooves are formed by cutting, the desired cam ring can be precisely and effectively manufactured at low cost. In particular, in case of non-linear cam grooves, precise cam profiles can be precisely formed by cutting.

I claim:

1. A cam ring of substantially annular shape for a lens barrel, said lens barrel including a lens group having an optical axis, said lens group being movable along the direction of the optical axis, said lens group including at least one guide pin, said cam ring comprising at least one cam groove, said at least one guide pin being engageable in a respective cam groove, and a gear which is provided on an outer surface of said cam ring to enable rotation of said cam ring, wherein at least a part of said cam groove is in the form of a cam groove with a closed bottom located on an inner surface of said cam ring, said gear being integrally formed on the outer surface of said cam ring, wherein said gear is inclined with respect to the circumferential direction of said cam ring.

2. A cam ring according to claim 1, wherein said cam groove has a non-linear profile.

3. A cam ring of a substantially annular shape for a lens barrel, said lens barrel including a lens group having an optical axis, said lens group being movable along the direction of the optical axis, said lens group including at least one guide pin, said cam ring comprising at least one cam groove, said at least one guide pin being engageable in a respective cam groove, and a rotational guide means on an outer surface of said cam ring for enabling movement of said cam ring along the optical axis direction in accordance with rotation of said cam ring, wherein at least a part of said cam groove is in the form of a cam groove with a closed bottom located on an inner surface of said cam ring, said rotational guide means being integrally formed on the outer surface of said cam ring.

4. A cam ring according to claim 3, wherein said rotational guide means comprises a helicoid.

5. A cam ring according to claim 3, wherein said rotational guide means comprises a cam.

6. A cam ring of a substantially annular shape for a lens barrel, said lens barrel including a lens group having an optical axis, said lens group being movable along the direction of the optical axis, said lens group including at least one guide pin, said cam ring comprising at least one cam groove, said at least one guide pin being engageable in a respective cam groove, a gear which is provided on an outer surface of said cam ring to enable rotation of said cam ring, and a rotational guide means on the outer periphery of said cam ring for enabling movement of said cam ring along the optical axis direction in accordance with the rotation of said cam ring, wherein at least a part of said cam groove is in the form of an inner cam groove with a closed bottom located on a surface of said cam ring, said rotational guide means and said gear being integrally formed on the outer surface of said cam ring, and wherein said gear is inclined with respect to the circumferential direction of said cam ring.

7. A cam ring according to claim 6, wherein said rotational guide means comprises a helicoid.

8. A cam ring according to claim 6, wherein said rotational guide means comprises a cam.

9. A cam ring according to claim 6, wherein said cam ring, said gear and the rotational guide means are made of synthetic resin.

10. A lens barrel comprising a rotatable cam ring which includes at least one cam groove; a group of lenses having an optical axis, said group of lenses including a guide pin and engaged in an associated cam groove of said cam ring, said group of lenses being movable along the direction of the optical axis in accordance with rotation of said cam ring; a gear which is provided on an outer surface of said cam ring to enable rotation of said cam ring; and a rotational guide means on the outer surface of said cam ring to enable movement of said cam ring along the optical axis directions in accordance with the rotation of said cam ring, wherein at least a part of said cam groove is in the form of an inner cam groove with a closed bottom located on a surface of said cam ring, said gear and said rotational guide means being integrally formed on an outer surface of said cam ring, and wherein said gear is inclined with respect to the circumferential direction of said cam ring.

11. A cam ring according to claim 10, wherein said rotational guide means comprises a helicoid.

12. A cam ring according to claim 10, wherein said rotational guide means comprises a cam.

13. A method for manufacturing a cam ring of a substantially annular shape for a lens barrel, said cam ring having at least one cam groove, said lens barrel including a lens group having an optical axis, said lens group being movable along the direction of the optical axis said lens group including at least one guide pin and engageable in a respective cam groove, at least a part of said cam groove being in the form of a cam groove with a closed bottom located on an inner surface of said cam ring, and a gear which is provided on an outer surface of the cam ring to enable rotation of the cam ring, comprising the step of molding the cam ring and the gear at one time with a synthetic resin, and wherein said gear is inclined with respect to the circumferential direction of said cam ring.

14. A method according to claim 13, wherein said cam groove is formed by cutting after the cam ring and the gear are molded.

15. A method according to claim 13, wherein the cam groove has a non-linear profile.

16. A method according to claim 13, wherein the cam groove is formed in two steps which comprise molding a primary cam groove together with the cam ring and the gear at one time and then finishing the primary cam groove by cutting.

17. A method for manufacturing a cam ring of a substantially annular shape for a lens barrel having at least one cam groove, said lens barrel including a lens group having an optical axis, said lens group being movable along the direction of the optical axis, said lens group including at least one guide pin and engageable in a respective cam groove, at least a part of the cam groove is in the form of a cam groove with a closed bottom located on an inner surface of said cam ring, and a rotational guide means on an outer periphery of the cam ring for enabling movement of the cam ring in the optical axis direction in accordance with the rotation thereof, comprising the steps of molding the cam ring and the rotational guide means at one time with a synthetic resin, and then forming the at least one cam groove by cutting.

18. A method according to claim 17, comprising molding said rotational guide means as a helicoid or a cam.

19. A method for manufacturing a cam ring of a substantially annular shape for a lens barrel having at least one cam groove, said lens barrel including a lens group having an optical axis, said lens group being movable along the direction of the optical axis, said lens group including at least one guide pin and engageable in a respective cam groove, at least a part of the cam groove being in the form of a cam groove with a closed bottom located on an inner surface of said cam ring, a gear being provided on an outer surface of the cam ring to enable rotation of the cam ring, and a rotational guide means on the outer periphery of the cam ring for enabling movement of the cam ring in the optical axis direction in accordance with the rotation of said cam ring, comprising the steps of molding the cam ring, the gear and the rotational guide means of a synthetic resin at one time, and then forming the at least one cam groove by cutting.

20. A method according to claim 19, comprising molding the rotational guide means as a helicoid or a cam.

21. A method according to claim 19, wherein the gear is inclined with respect to the circumferential direction of the cam ring.

22. A method according to claim 19, wherein the synthetic resin of the cam ring, the gear and the rotational guide means are molded is selected from the group of polycarbonate, polyphenylensulfide and polyphenylenoxide resins.

23. A method according to claim 22, wherein fluorine is added to the synthetic resin as a lubricant.

24. A method according to claim 23, wherein glass fiber is added to the synthetic resin as a reinforcement.

25. A method according to claim 23, wherein carbon is added to the synthetic resin as a reinforcement.

26. A method according to claim 22, wherein carbon is added to the synthetic resin as a lubricant.

* * * * *

UNITED STATES PATENT AND TRADEMARK OFFICE
CERTIFICATE OF CORRECTION

PATENT NO. : 5,255,124
DATED : October 19, 1993
INVENTOR(S) : Makoto IWAMURA

It is certified that error appears in the above-indentified patent and that said Letters Patent is hereby corrected as shown below:

On the cover of the printed patent, in section [75] "Inventor", line 1, change "Makota" to ---Makoto---.

Signed and Sealed this

Eighteenth Day of February, 1997

Attest:

BRUCE LEHMAN

*Attesting Officer*     *Commissioner of Patents and Trademarks*